United States Patent [19]
Wang et al.

[11] Patent Number: 6,069,686
[45] Date of Patent: *May 30, 2000

[54] SELF-CALIBRATING OPTICAL FIBER PRESSURE, STRAIN AND TEMPERATURE SENSORS

[75] Inventors: Anbo Wang; Wei Zhao; Jun Wang; Hai Xiao, all of Blacksburg, Va.

[73] Assignee: Virginia Tech Intellectual Properties, Inc., Blacksburg, Va.

[*] Notice: This patent is subject to a terminal disclaimer.

[21] Appl. No.: 09/309,660

[22] Filed: May 11, 1999

Related U.S. Application Data

[63] Continuation of application No. 08/904,315, Jul. 31, 1997.
[51] Int. Cl.[7] .................................................. G01B 9/02
[52] U.S. Cl. ........................ 356/35.5; 356/345; 356/352
[58] Field of Search ................................. 356/345, 352, 356/35.5

[56] References Cited

U.S. PATENT DOCUMENTS 5,301,001  4/1994  Murphy et al. .

Primary Examiner—Robert H. Kim
Assistant Examiner—Andrew H. Lee
Attorney, Agent, or Firm—Whitham, Curtis & Whitham

[57] ABSTRACT

Broadband energy incident on a transducer having partially or fully reflective surfaces separated by a gap which is greater than the coherence length of the broadband energy but smaller than one-half a coherence length of a band of energy within said broadband energy causes a portion of the spectral content of the broadband energy corresponding to a coherence length greater than twice the gap length to exhibit interference effects while the average power of the broadband energy remains unaffected. Splitting energy reflected from the transducer into two beams which are filtered at preferably similar center frequencies but with different pass bands yields beams which are radically different in sensitivity to changes in gap length. Analyzing the beams to derive a ratio of powers (since source intensity and fiber attenuation in a common fiber are thus self-cancelling) allows high accuracy and high resolution absolute measurement of temperature, pressure or strain. Effects of any of these physical parameters which are not of interest in a measurement can be fully compensated or made arbitrarily insignificant in a simple transducer structure of extremely small size. Use of broadband energy permits measurement over greater lengths of optical fiber.

40 Claims, 3 Drawing Sheets

SELF-CALIBRATING OPTICAL FIBER PRESSURE, STRAIN AND TEMPERATURE SENSORS

CROSS-REFERENCE TO RELATED APPLICATIONS

This application is a continuation of U.S. patent application Ser. No. 08/904,315, filed Jul. 31, 1997.

BACKGROUND OF THE INVENTION

1. Field of the Invention

The present invention generally relates to remote condition sensors and measurement devices and, more particularly, to remote measurement and sensing using optical fiber communication links.

2. Description of the Prior Art

Condition sensing and measurement are encountered in many diverse fields of endeavor. Many of these applications require very precise measurement of a physical parameter and often at extremely inaccessible locations and/or where severe conditions exist. For example, so-called down-hole telemetry in petroleum exploration or production, the sensor may be required to communicate with the remainder of the measurement system over substantial distances while making extremely accurate and highly sensitive measurements of strain, pressure or temperature in an environment of very high temperatures and pressures which may adversely affect calibration of the sensor, compromise accuracy or limit resolution of the measurement through environmental effects on the communication link including electrical or magnetic noise.

So-called optical fiber sensors employing a transducer exploiting an optical effect and communicating over a length of optical fiber are known and used in some of the more adverse measurement environments. Optical fibers are not susceptible to the pick-up of electrical or magnetic noise and optical energy transmitted thereto can often provide a reference measurement for calibration or correction of a measured value. For example, transmission and return of optical signals over the same or a pair of optical fibers which are constrained to have the same geometrical configuration (e.g. by identity or being joined together) can provide compensation for optical signal losses in the fiber. The use of optical fibers also allows compensation to be determined through use of spectrally separated optical signals.

However, transmission of light through optical fibers, while efficient, is imperfect and attenuation of the light signal energy will occur over the length of any optical fiber. Spectral separation of optical signals is generally accomplished with passive optical filters to avoid introduction of additional variables and potential non-linearities into the measurement with active devices. Passive optical filters are also less than fully transmissive to any wavelength and greatly reduce the energy of a broad band light source by their filtering action which strongly attenuates a range of wavelengths and for which the filter is employed. When filters are employed in the transducer (as opposed to the detector end of the system) both of these factors limit the accuracy of compensation of optical fiber sensors and limit the length of optical fiber over which communication with the transducer may be accomplished within practical sensitivities of energy sensors and noise immunity of the optical portion of the measurement system.

Returning to the down-hole telemetry example alluded to above, the capabilities of drilling equipment at the present state of the art permits wells substantially in excess of one mile in depth and presenting increased levels of temperature and pressure where measurements of extremely high accuracy and resolution are desirable. However, known passive optical fiber sensors are not capable of producing accurate, high resolution and/or compensated absolute measurements under such conditions and over such distances.

Further, it is not practical to even approximate or simulate the conditions of temperature and pressure which will be encountered in such an environment. Therefore, calibration of the transducer and communication link for such conditions is similarly not practical and any attempt to do so, particularly over the distances and variety of environmental conditions which may be encountered by the fiber optic link would compromise the measurement sought to be made. Further, known compensated optical fiber sensors are not capable of reliable operation, if operable at all, with ultra-high resolution and accuracy over distances for which telemetry is currently required.

Additionally, extremes of temperature and, possibly, pressure can permanently or reversibly alter the optical properties of filters if used in passive optical transducers (e.g. by subtle alteration of pigment composition, crystal lattice spacing or polarizing effects due to strain), as is generally the case in known transducers. While systems are known in which such changes of optical properties may not be important, the possibility of changes in optical properties may be a source of error or variability in measurement systems

SUMMARY OF THE INVENTION

It is therefore an object of the present invention to provide a self-calibrated optical fiber sensor capable of making measurements of strain, temperature or pressure with high accuracy and resolution under adverse conditions and over large distances.

It is another object of the present invention to provide an optical transducer for measurement of pressure and strain which can be fully compensated for variations in optical source power, fiber losses and temperature.

It is yet another object of the invention to provide a self-calibrated and compensated optical fiber sensor which uses broad band light for measurement and signaling.

In order to accomplish these and other objects of the invention, an optical fiber measurement system is provided including a source of broadband energy, a transducer receiving the broadband energy having a gap between reflective interfaces of a length which is greater than one-half a coherence length of the broadband energy, a band-pass filter having a pass band smaller than a spectral content of the broadband energy and corresponding to a coherence length greater than twice the length of the gap, and an arrangement for determining a ratio of energy of a portion of the broadband energy reflected by the transducer having a coherence length less than twice the length of said gap and energy of another portion of the broadband energy reflected by the transducer having a coherence length greater than twice the length of the gap.

In accordance with another aspect of the invention, a method of measuring temperature, pressure or strain is provided including the steps of reflecting broadband energy from two spaced interfaces defining a gap wherein the gap varies with temperature, pressure or strain, the broadband energy having a coherence length less than one-half the gap length, band pass filtering a portion of reflected broadband energy in accordance with a pass band corresponding to a coherence length greater than twice the gap length, and comparing power of the portion of reflected broadband energy filtered by the band pass filtering step with power of another portion of the broadband energy.

In accordance with a further aspect of the invention, an optical transducer for a measurement system using broadband energy is provided including two reflective interfaces spaced from each other and capable of causing an interference between energy reflected by respective ones of said interfaces, spacing between the interfaces being greater than a coherence length of the broadband energy, and means for limiting change of spacing of said two reflective interfaces over a measurement range to one-quarter of a center wavelength of energy included in the broadband energy.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
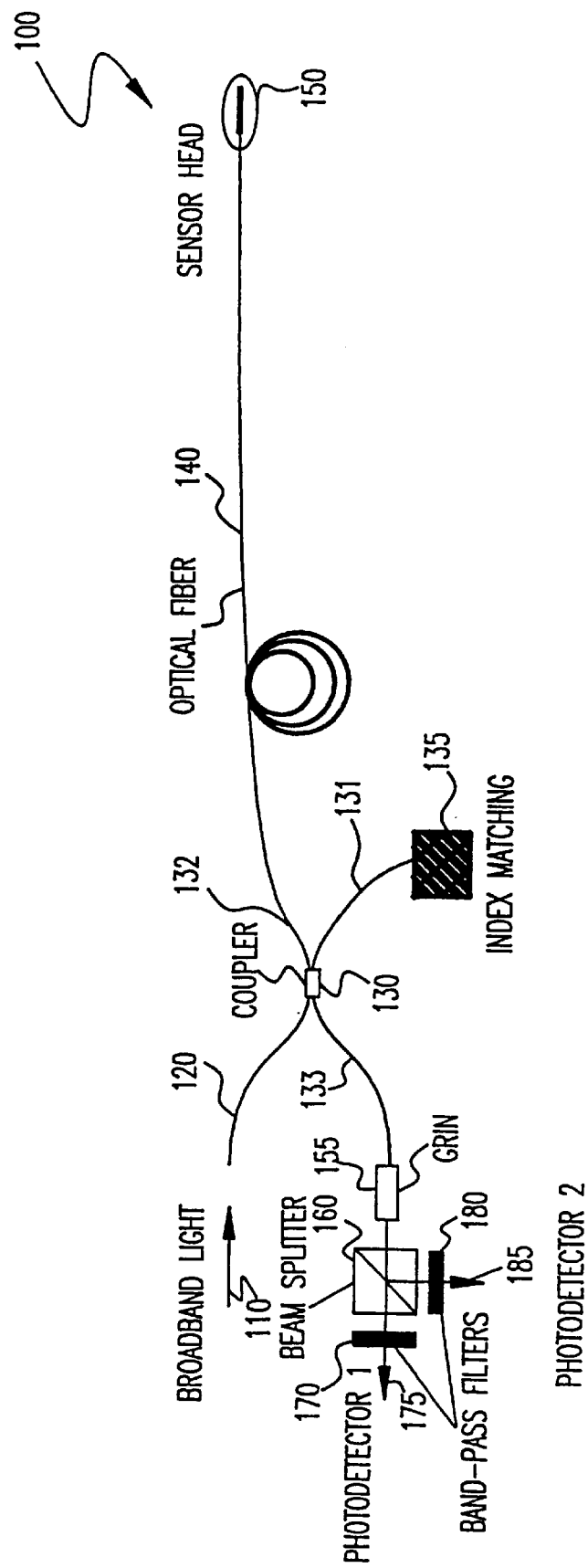
FIG. 1 is a schematic illustration of an optical fiber transducer and measurement arrangement in accordance with the invention.

Referring now to the drawings, and more particularly to FIG. 1, there is shown, in schematic form, an optical fiber measurement system 100 in accordance with the invention. It is to be understood that several of the elements shown in FIG. 1 are also common to known optical fiber sensor arrangements (but may not have the same properties as in the present invention) and that the illustration of FIG. 1 is arranged in a manner to facilitate comprehension by those skilled in the art. Therefore, while FIG. 1 may appear similar to some known optical fiber sensor arrangements, no portion of FIG. 1 is admitted to be prior art as to the present invention other than specific elements which may be indicated as possibly being of a known type in the following discussion.

Specifically, the system of the present invention receives energy input from a broadband light source depicted by arrow 110. The precise nature of the broadband light source is not important to the practice of the invention but relatively high power sources such as incandescent or halogen (e.g. so-called tungsten-halogen) light sources or light emitting or superluminescent diodes are preferred. As will be evident from the following discussion and in particular regard to these latter devices, it should be understood that the term "broadband" is used in a relative sense (e.g. broader than an available band pass filter) and does not necessarily infer white light. Alternatively, a plurality of monochromatic light sources respectively operating over a range of different wavelengths could, in theory, be used.

Light from broadband light source 110 is carried through optical fiber 120 to a so-called two-by-two coupler 130. Other types and configurations of couplers could also be used, particularly if plural light sources are employed, as alluded to above. One output or leg (131) of the coupler 130 is terminated by an index matching device 135 of a known type to prevent reflection back into the coupler 130 to interfere with the measurement process.

Another leg 132 of the coupler 130 forms or is connected to the optical fiber 140 through which communication to and from the sensor head or transducer 150 takes place. Optical fiber 140 can be either a single mode or multi-mode fiber although a multi-mode fiber may offer better measurement resolution since more power from a broadband light source can usually be coupled into a multi-mode fiber. As will be discussed below, a desired measurement is performed by reflections of respective portions of the light input to the transducer 150 which are returned over optical fiber 140 to coupler 130. Light thus returned to leg 132 of coupler 130 is extracted on another leg 133 of coupler 130 which will then be analyzed to make the desired measurement.

Specifically, it is preferred, for efficiency and resolution of the measurement apparatus to collimate the reflected light output on coupler leg 133 with a quarter-pitch graded index (GRIN) of refraction device 155 of any well-known type and which is not necessary to the practice of the invention. As is well-understood in the art, the graded index of refraction over the radius of the device refracts light therein in proportion to the angle of propagation of the light to the axis of the GRIN device. Thus, assuming a properly designed gradient of refractive index, substantially parallel or collimated light propagation at its output will be achieved.

The light output by coupler leg 133 (preferably collimated, as discussed) is directed into beam splitter 160 of any type or construction which divides the light beam into two separate beams. These preferably broadband beams are differentially spectrally band-pass filtered with pass bands of different width into spectral components above and below a wavelength dependent on a gap between reflective surfaces in transducer 150 as will be discussed below by filters 170 and 180, each associated with a respective output beam of beam splitter 160, and received by respective photodetectors 175 and 185 by which a self-referenced (and, hence, self-calibrating with appropriate and well-understood processing) measurement is made.

Figure 2:
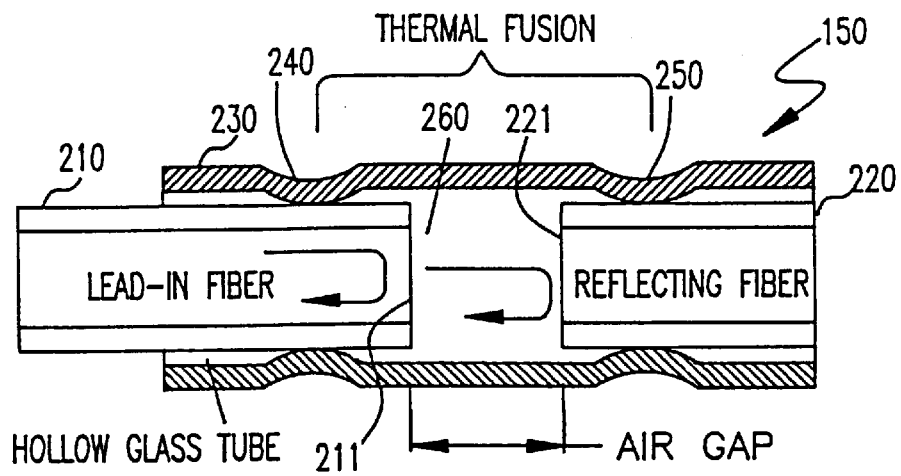
FIG. 2 is an enlarged cross-sectional view of the optical transducer of FIG. 1.

Referring now to FIG. 2, the principles of the invention as exploited by the structure of transducer 150 will be discussed in detail. The sensor 150 is extremely simple, comprising a lead-in fiber 210 which is comprised of or coupled to a terminal portion of optical fiber 140 of FIG. 1 and a reflecting fiber 220 spaced therefrom across a gap 260, preferably embodied as an air gap. Nominal dimensions of gap (hereinafter "air gap") 260 are preferably maintained by a hollow tube or topologically similar structure 230 bonded to each of the lead-in fiber 210 and reflecting fiber 220 at separated locations 230 and 240, respectively.

However, it should be understood that the material within "air gap" 260 and physical state thereof (e.g. if a fluid, the pressure thereof at a nominal temperature) is not particularly important to the practice of the invention so long as the refractive index of the material differs sufficiently from that of the optical fibers 210, 220 to provide suitably reflective interfaces at both ends of the gap 260. (For example, partial reflectivity of the end surfaces of the lead-in and the reflecting fibers should be determined in accordance with anticipated power levels at detectors 175 and 185 subsequent to band pass filtering. In general, it is considered preferable to keep the intensity levels of reflected light similar for the two surfaces to obtain optimum fringe visibility. Reflectivity from the surface of the reflecting fiber may be augmented by metallization or the like, if necessary or desired.)

That is, the material placed in the "air gap" 260 and its physical parameters such as pressure or preloading can be freely chosen as an incident of the design of the transducer 150 in accordance with anticipated measurement range, resolution and accuracy requirements and environmental conditions and the properties (e.g. refractive index, Young's modulus, coefficient of thermal expansion (CTE) and the like) as long as suitably reflective interfaces are formed. The precise path length difference provided by the air gap as illustrated in FIG. 2, while important to the principles of the invention, is not particularly critical to the practice of the invention. Nevertheless, a short air gap is preferred for several practical reasons including compactness of the transducer, as will become apparent to those skilled in the art in light of the following discussion.

To understand the basic principles of the invention, it is important to understand the concept of coherence length, particularly as it applies to broadband electromagnetic energy such as broadband light. Specifically, coherence length is a somewhat arbitrarily defined but quantitative parameter (varying with the square of the center wavelength divided by the spectral width). The coherence length is inversely proportional to a spectral width of energy in a beam which comprehends or includes particular different wavelength components of the energy beam. A very broadband beam thus corresponds to a very short coherence length. Conversely, a very narrow spectral width corresponds to a very long coherence length. Moreover, it should be understood that each of any of a plurality of arbitrary narrow bands which can be isolated by filtering from a broader band beam will exhibit a relatively longer coherence length while the broader band beam continues to exhibit a relatively shorter coherence length.

In this regard, it should also be noted from FIG. 2 that the light which is reflected from surface 221 of reflecting fiber 220 traverses air gap 260 twice and is thus delayed from the reflection from the end surface 211 of lead-in fiber 210. If the coherence length of the incident optical beam or a spectral band therein is greater than twice the optical length of the air gap (e.g. accounting for the refractive index of the material), strong interference will occur between the two reflected beam components and consequent periodic variations in the intensity of the reflected light will be observed at a point of the reflected beam as the air gap is continuously increased or decreased. It should be noted in this regard that practical power levels of energy beam components thus impose a practical limit on air gap length. That is, as the air gap is made longer, the spectral width of a band which will produce strong interference will diminish.

It should be further noted that the periodic variations in the intensity of reflected light noted above should be understood to occur in the time domain during continuous variation of gap length although the measurement system is not operated in such a mode, as should be evident from the limitations on gap dimensions relative to incident energy wavelength which will produce interference or observable levels of such interference. As will be discussed in greater detail below, change of air gap length in the preferred mode of operation is limited to a relatively narrow range corresponding to a fraction of a cycle of the periodic variation of intensity referred to above within the range of air gap lengths for which such periodic variation during continuous variation of air gap length is observable.

As the air gap is changed, the power and energy of the spectral component bands within a broadband beam which will correspond to a correspondingly altered coherence length and thus cause observable interference will also change dramatically. Conversely, if the coherence length of the broadband beam is much shorter than the doubled air gap, the interference, on average over the band width of the beam will be negligible and no periodic variations in the sensor output will be observed.

It is important to an understanding of the invention to note that these effects may be observed concurrently for different ranges of spectral widths within the same broadband beam and that the ranges of spectral components for which interference effects will be observed (and the energy or power therein) will change with changes in the dimensions of the air gap. That is, in accordance with the principles of the invention, the total average energy of bands within the broadband beam which produce periodic variations in light intensity is a function of the (doubled) air gap length, resulting in a strong change in energy with change of air gap length.

Thus by providing filtering at 170, 180 for different band pass widths, one of beams 175 and 185 will be substantially limited to (or "see") a range of wavelengths which will be strongly affected by changes in air gap length while the other will be affected little and generally negligibly over a broad band of wavelengths by air gap changes. That is, over a pass band within a broader incident energy band, coherence lengths which produce interference effects for a range of air gap length will be correspondingly more dominant than over the broader incident energy band.

Figure 3:
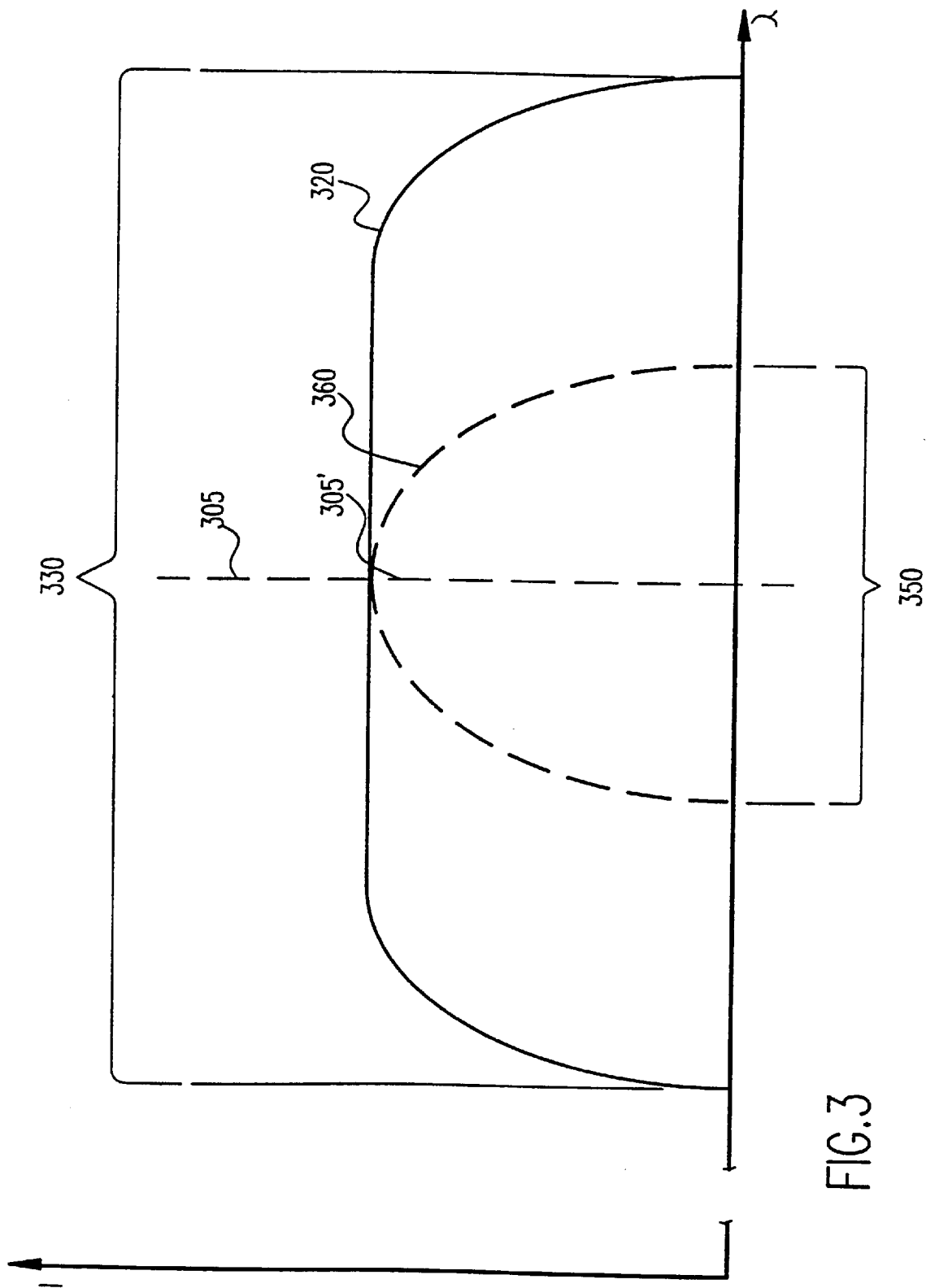
FIG. 3 is a graphical representation of electromagnetic energy spectra useful in understanding the present invention.

Referring to FIG. 3 and assuming a central wavelength 305 for a broadband incident energy beam 320 and that the doubled air gap is greater than the coherence length corresponding to the full spectrum 320 of the broadband incident radiation, a distribution of wavelengths 360 having a narrower spectrum 350 (corresponding to the narrower of the pass bands of filters 170, 180 of FIG. 1) within that of the broadband energy spectrum 320 will cause interference and result in periodically varying intensity fluctuations with change of air gap length. The center frequency or wavelength of the broadband energy from the source or as filtered at 170 or 180 need not be the same as the center frequency or wavelength 305' of the narrow band 360 as long as the narrow band is within a relatively flat region of the broadband spectrum 320.

Thus, as observed on average by a practical light/energy sensor, the length of the (doubled) air gap determines the proportion of incident energy which results in interference of a component of the energy reflected from the sensor as well as the average power seen in the average interference pattern. As the air gap changes in response to a measured condition, the power observed at the detector (175 or 185) of portions of the broadband spectrum 320 within narrow band 350, 360 having a coherence length greater than the doubled air gap and causing interference will also increase or decrease. The observed power in the interference pattern will also change strongly with changes in air gap length for each arbitrary band within the narrow band filtered beam and will also be strongly observed on average over pass band 350. The ratio of energies or optical powers of the spectrum 320 and the partial spectrum 350 as observed in a fringe of the interference pattern will thus provide a measure of the parameter of interest.

Since the signals (considered as either the energy reflected from the interfaces of the sensor or the signals output by beam splitter 160) derive from the same optical source and travel along the same optical path, variations in power of the optical source and fiber attenuation will be common to both signals. The ratio of optical powers is thus immune to variation from either or both of these causes which are usually inevitable in other practical optical fiber measurement systems, particularly those adapted for remote sensing. Since these sources of variation are common to both output channels (e.g. the outputs of filters 170, 180) and can be thus compensated by sensing the relative power (e.g. as a ratio) of the beams, changes in relative power will represent only dimensional changes of the air gap length. Changes in the air gap length are effectively doubled by the optical configuration discussed above, increasing system sensitivity thereto.

Viewed from the standpoint of transducer and detector design, the air gap 260 of the sensor 150 must be selected in such a way that the air gap is longer than the coherence length of full broadband spectrum 330 but shorter than the coherence length of a narrower spectrum (e.g. corresponding to the filter pass band 350) which will be of suitable optical power to be detected with good resolution after filtration at 170, 180 by photosensors 175, 185. Filters 170, 180 are preferably band-pass filters having the same or similar (depending on the "flatness" of the broadband spectrum) center frequencies but different spectral bandwidths; the narrower bandwidth corresponding to a nominal value of the doubled air gap of the sensor such that the coherence length of the pass-band of the filter is much longer than the doubled air gap. Thus, the optical power in each of the two channels produced by beam-splitter 160, after filtering, will have very different sensitivities to changes in the length of the air gap which will be reflected in the relative optical power of the respective filtered beams, as discussed above.

Like other interferometers, ambiguity can be introduced into the measurement provided by the transducer unless resolved by fringe counting or phase tracking which is usually sophisticated and costly preventing absolute measurements. However, the introduction of ambiguity can be avoided and any need for fringe counting or phase tracking eliminated by designing the sensor with an air gap having limited variation of length with monitored conditions.

By providing an air gap meeting the above length criterion and such that the transducer operates within a relatively linear "half-fringe" region (limiting the maximum air gap length variation with anticipated range of conditions to one-quarter of the center or other wavelength) a unique, functional, one-to-one relationship between air gap length and sensor output power ratio is assured. It should be understood, however, that while this limitation to a half-fringe operating range is much preferred in view of the system simplification provided, this feature of the preferred embodiment of the invention is not essential to the successful practice of the invention in accordance with the basic principles thereof.

That is, while the air gap length is not particularly critical to the practice of the invention, a short air gap is preferred to increase maximum power and power variation observable in the signal (since observability of interference effects and power therein diminishes with air gap length, as alluded to above) and to avoid excess sensitivity to the parameter of interest as well as to minimize overall dimensions of the transducer. Excess sensitivity to change of the measured parameter can be readily understood since a given change in, for example, temperature or pressure will result in a change of air gap length which will be proportional to length of the transducer affected by the measured parameter and which is generally coextensive with air gap length.

Therefore, a very short air gap on the order of a few microns to a few tens of microns generally assures both sufficient power for measurements of high accuracy and resolution while avoiding the need for system complexities such as fringe counting to avoid measurement ambiguity. If necessary to provide coverage of wide variation of values of a parameter of interest, the sensitivity of the transducer can be further limited as discussed below.

This feature of the preferred form of the invention also allows the transducer to be formed at very small size (e.g. 150 $\mu$m in diameter and 300 $\mu$m in length) and of high robustness. The hollow sleeve portion 230 is not involved in the optical effects exploited by the transducer and thus can be fabricated from any desired material (e.g. to resist corrosion to choose a particular coefficient of expansion, etc. in any combination) and may, if desired or advantageous in a particular environment, enclose the salient or distal end of the reflecting fiber or other reflecting structure 220, such as a diaphragm for sensing of fluid pressure.

Differences in the optical power of the filtered beams may be derived in several different ways in accordance with the principles of the invention. Preferably, if the bandwidth of the broadband light source is very large, consistent with maintaining highest possible light intensity through the system for greatest practical monitoring distance and length of optical fiber 140 and high sensitivity to very small variations in air gap length with small changes in the parameter of interest, it is desirable to choose a narrow-band filter which sets the pass band 350 at a range significantly larger than that corresponding to coherence length at an extreme measurement anticipated for the transducer.

It should also be appreciated that filtering is not necessary in both channels and can be provided in only one channel if the broadband spectrum of the light source is well-defined and relatively stable, as in the case of a light-emitting diode. That is, while output spectra of light-emitting diodes are known to vary significantly but predictably with substantial excursions of temperature, in the case of the present invention, temperature can be readily controlled since the light source is located at the detector end of the fiber. In such a case, it is sufficient to provide a single filter (e.g. 185) of significantly narrower bandwidth for limitation of its output to observe interference in order to successfully practice the invention. Use of a narrow pass band filter in combination with a light-emitting diode is a particularly desirable combination to implement the invention since the spectral content of a light-emitting diode is substantially invariant over time and can be more efficiently coupled to an optical fiber than white light sources.

Figure 4:
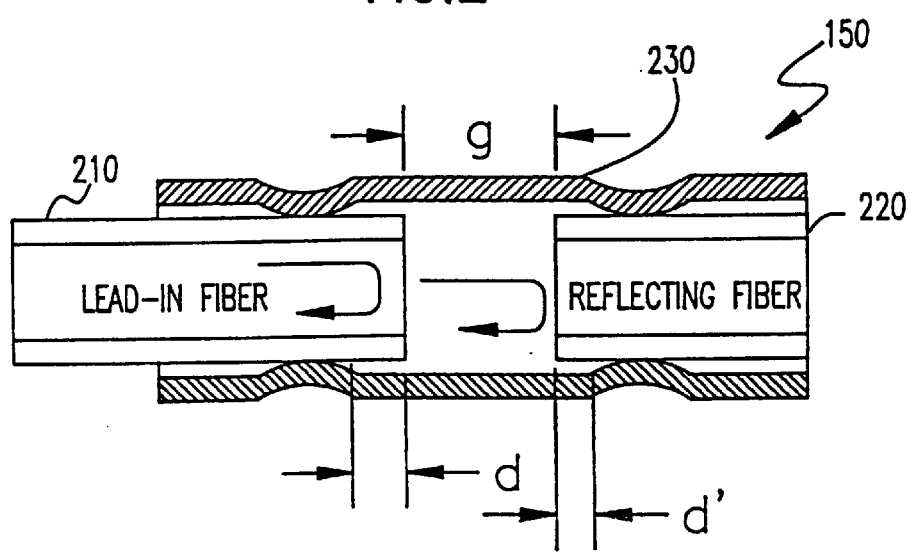
FIG. 4 is a view of the optical transducer of FIG. 2 illustrating pressure or strain measurement with temperature compensation.
Figure 5:
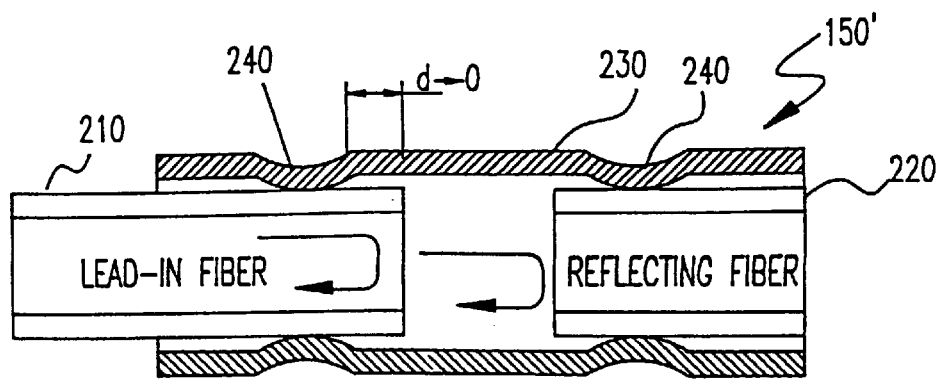
FIG. 5 is a similar view of the optical transducer of FIG. 2 illustrating temperature while minimizing effects due to pressure.

Having explained the principles and operation of the invention, reference will now be made to FIGS. 4 and 5 for preferred forms of temperature and pressure sensors which are either fully or substantially immune to effects of other environmental conditions. Specifically, FIG. 4 shows a sensor 150, as shown in FIG. 2, as well, for discussion of providing for temperature compensation during pressure or strain measurement. FIG. 5 shows a temperature sensor including adaptations which, while not providing complete compensation for pressure variations, at least provides limitation of pressure effects on the temperature measurement.

From the above discussion of FIG. 2, it can be understood that any combination of pressure, strain and/or temperature can alter the length of the air gap. Therefore, in the embodiment shown in FIG. 4, substantial compensation for temperature in a pressure or strain sensor can be achieved by merely fabricating lead-in fiber 210, reflecting fiber 220, and hollow sleeve 230 of the same material or materials having the same coefficient of thermal expansion (CTE). Exact compensation can be achieved by proportioning the CTE's of the lead-in and reflecting fibers and the CTE of the hollow sleeve 230 and the locations where the fibers are bonded to the sleeve such that the ratio of the CTE of the sleeve to the CTEs of the fibers is d+d':d+d'+g. It can be understood that when g becomes small relative to d and/or d', as would usually the case in view of the preferred short air gap as described above, the difference between substantial and exact compensation becomes vanishingly small.

Thus, simply fabricating the entire pressure sensor from a single material such as the silicate glass of common optical fibers with d several times the nominal air gap length is much preferred and provides substantial, although theoretically not complete, compensation for temperature. In this regard, it should be noted that sensitivity to strain or pressure and range of measurement can be varied by choice of d and d' relative to the distance between bonds 240 preferably chosen to keep the gap variation within one-quarter of the center wavelength constraint described above. Choice of material for sleeve 230 to have an increased Young's modulus of elasticity may extend the measurement range for given values of d and d' at the expense of resolution and sensitivity.

Conversely, in the temperature transducer of FIG. 5, effects of pressure will be minimized if d is made as small as possible while the difference in CTE between the sleeve 230 and the fibers 210, 220 is maximized within the preferred one-quarter wavelength maximum variation with measured parameter variation as discussed above. In practice, use of borosilicate glass (BSG) for hollow sleeve 230 together with common silicate glass (SG) fibers is sufficient for successful practice of the invention while permitting the sensor to function at temperatures up to the softening temperature of the sensor materials. Effects of strain will be minimized (in either pressure or temperature transducers) by choosing the material of sleeve 230 to have a Young's modulus of elasticity as large as possible consistent with other environmental factors.

Both pressure and strain effects can be further precorrected by adjustment of nominal fluid pressure in the air gap to counteract such forces at a nominal working temperature and the transducer suitably calibrated accordingly. However, as a practical matter, pressure and strain corrections are generally small if the transducer itself is no longer than necessary since even large forces will cause only a change of a small percentage of sensor length. Thus corrections for pressure and/or strain may be relatively negligible or susceptible of substantially complete correction based on calibration and rough estimates of pressure and/or strain.

In view of the foregoing, it is seen that the invention provides for temperature, pressure or strain measurement over large distances and with high accuracy and resolution while providing compensation or at least minimization of effects of those physical parameters other than the parameter of interest with simple, intensity based signal detection and processing. Energy source and fiber transmission loss variations are fully compensated. The transducer is simple, inexpensive to fabricate, extremely small and robust and, depending on materials, resists flammable and corrosive environments. Moreover, no optical filtering is required in the transducer and only reflections which are immune to environmental conditions are employed.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An optical fiber measurement system including
   a source of broadband energy,
   an interferometric transducer means for producing periodic intensity variation with continuous change in measurand by a path length difference,
   a band-pass filter having a pass band smaller than a spectral content of said broadband energy and corresponding to a coherence length greater than said path length difference, and
   means for determining a ratio of energy of a portion of said broadband energy received from said interferometric transducer means having a coherence length less than said path length difference to energy of another portion of said broad band energy received by said transducer having a coherence length greater than said path length difference.

2. A system as recited in claim 1, wherein said means for determining a ratio include a beam splitter.

3. A system as recited in claim 1, further including a means for collimating a beam of energy reflected from said transducer.

4. A system as recited in claim 3, wherein said means for collimating includes a graded index of refraction optical element.

5. A system as recited in claim 1, wherein said source of broadband energy includes a tungsten-halogen light source.

6. A system as recited in claim 1, wherein said source of broadband energy includes a light-emitting diode.

7. A system as recited in claim 1, wherein said source of broadband energy includes a superluminescent diode.

8. A system as recited in claim 1, wherein said source of broadband energy includes a plurality of monochromatic light sources.

9. A system as recited in claim 1, wherein said path length difference of said transducer means is twice a length of a gap between optical interfaces and wherein said transducer means further includes means for altering separation of said optical interfaces responsive to variation of said measurand.

10. A system as recited in claim 9, wherein one of said interfaces includes metallization.

11. A system as recited in claim 9, wherein one of said interfaces includes a diaphragm.

12. A system as recited in claim 9, wherein one of said optical interfaces are formed by an end of an optical fiber and said means for altering separation of said optical interfaces includes a sleeve attached to said optical fiber.

13. A system as recited in claim 12, wherein said sleeve is attached to said optical fiber at a location spaced from said end of said optical fiber by a distance.

14. A system as recited in claim 13, wherein said sleeve and said optical fiber are made of the same material.

15. A system as recited in claim 14, wherein said material is silicate glass.

16. A system as recited in claim 13, wherein a coefficient of thermal expansion of said tube and a coefficient of thermal expansion of said optical fiber have a ratio substantially equal to a ratio of said distance to a sum of said distance and said gap.

17. A system as recited in claim 13, wherein said optical fiber is made of silicate glass and said sleeve is made of a material different from said fiber material.

18. A system as recited in claim 17, wherein said material different from said fiber material is borosilicate glass.

19. A system as recited in claim 1, wherein variation of said path length difference is limited to a fraction of a wavelength of energy included in said broadband energy over a range of variation of said measurand.

20. An system as recited in claim 19, wherein said fraction is one quarter of a wavelength of energy included in said broadband energy.

21. A transducer as recited in claim 20, wherein said path length difference includes a plurality of interfaces and one of said plurality of interfaces includes metallization.

22. A transducer as recited in claim 20, wherein said path length difference includes a plurality of interfaces and one of said plurality of interfaces includes a diaphragm.

23. A transducer as recited in claim 20, further including a fluid in said path length difference.

24. A method temperature, pressure or strain including the steps of passing broadband energy through a transducer having a path length difference wherein said path length difference varies with temperature, pressure or strain, said broadband energy having a coherence length less than said path length difference, band pass filtering a portion of said broadband energy passed through said transducer in accordance with a pass band corresponding to a coherence length greater than said path length difference, and comparing power of said portion of broadband energy filtered by said band pass filtering step with power of another portion of said broadband energy.

25. A method as recited in claim 24, including the further step of collimating said broadband light.

26. A method as recited in claim 24, including the further step of splitting said broadband energy reflected by said.

27. A method as recited in claim 24, including the further step of band pass filtering said another portion of said broadband energy in accordance with a pass band corresponding to a coherence length of less said path length difference.

28. A method as recited in claim 24, wherein said step of passing a portion broad band energy through a transducer includes reflecting portions of said broad band energy from respective spaced optical interfaces.

29. A method as recited in claim 28, including the step of limiting variation of said path length difference to a fraction of a wavelength of energy included in said broadband energy over a range of variation of said pressure, temperature or strain.

30. An system as recited in claim 29, wherein said fraction is one quarter of a wavelength of energy included in said broadband energy.

31. An optical transducer for a measurement system using broadband energy including a path length difference greater than a coherence length of said broadband energy and capable of causing an interference of energy in a portion of said broadband energy having a coherence length greater than a coherence length of said broadband energy, and means for limiting change of said path length difference over a measurement range to a fraction of a wavelength of energy included in said broadband energy.

32. An optical transducer as recited in claim 15, wherein said path length difference is twice a gap length between optical interfaces and wherein said transducer means further includes means for altering separation of said optical interfaces responsive to variation of a measurand.

33. A transducer as recited in claim 32, wherein one of said optical interfaces is formed by an end of an optical fiber and said means for altering separation of said optical interfaces includes a sleeve attached to said optical fiber.

34. A transducer as recited in claim 33, wherein said sleeve is attached to said optical fiber at a location spaced from said end of said optical fiber by a distance.

35. A transducer as recited in claim 34, wherein said sleeve and said optical fiber are made of the same material.

36. A transducer as recited in claim 35, wherein said material is silicate glass.

37. A transducer as recited in claim 33, wherein said optical fiber is made of silicate glass and said sleeve is made of material different from the fiber material.

38. A transducer as recited in claim 37, wherein said material different from said fiber material is borosilicate glass.

39. A transducer as recited in claim 33, wherein a coefficient of thermal expansion of said sleeve and a coefficient of thermal expansion of said optical fiber have a ratio substantially equal to a ratio of said distance to a sum of said distance and said gap.

40. An optical transducer as recited in claim 15, wherein said fraction is one-quarter of a wavelength of energy included in said broadband energy.

* * * * *